Jan. 6, 1942.  W. BISSET  2,268,692
LOADING AND UNLOADING CONVEYER APPARATUS
Original Filed March 2, 1939   5 Sheets-Sheet 1
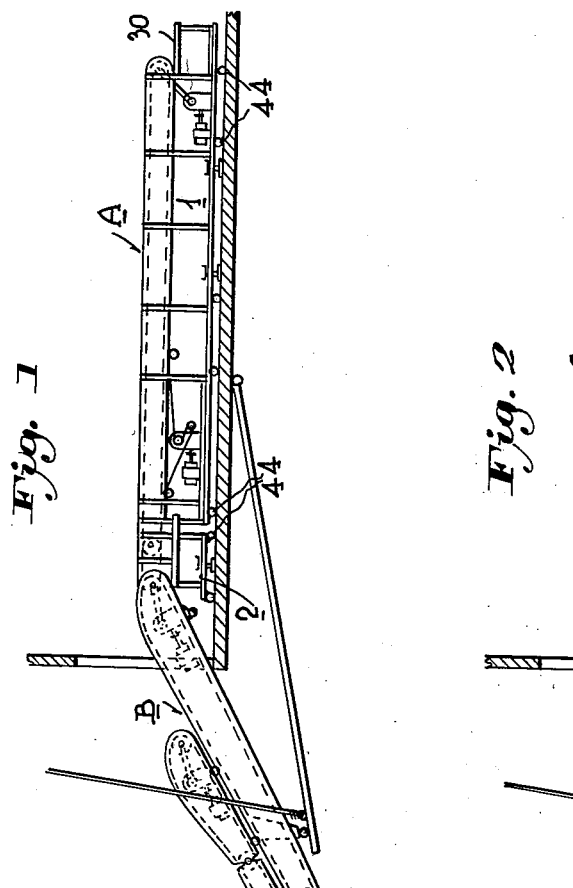
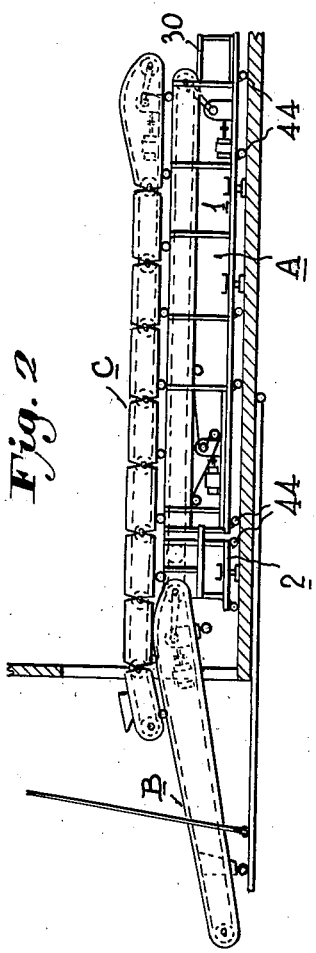
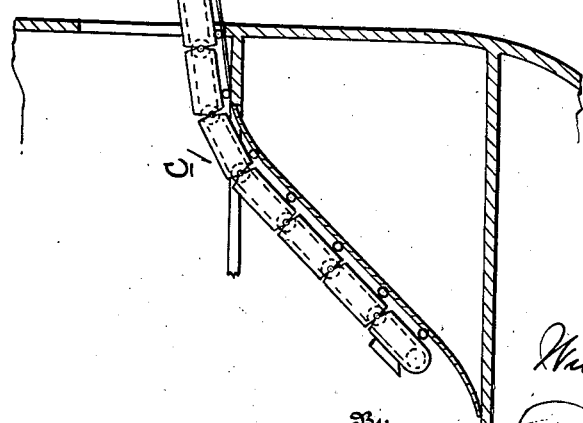
Inventor
William Bisset
By Arthur M. Hahn
Attorney

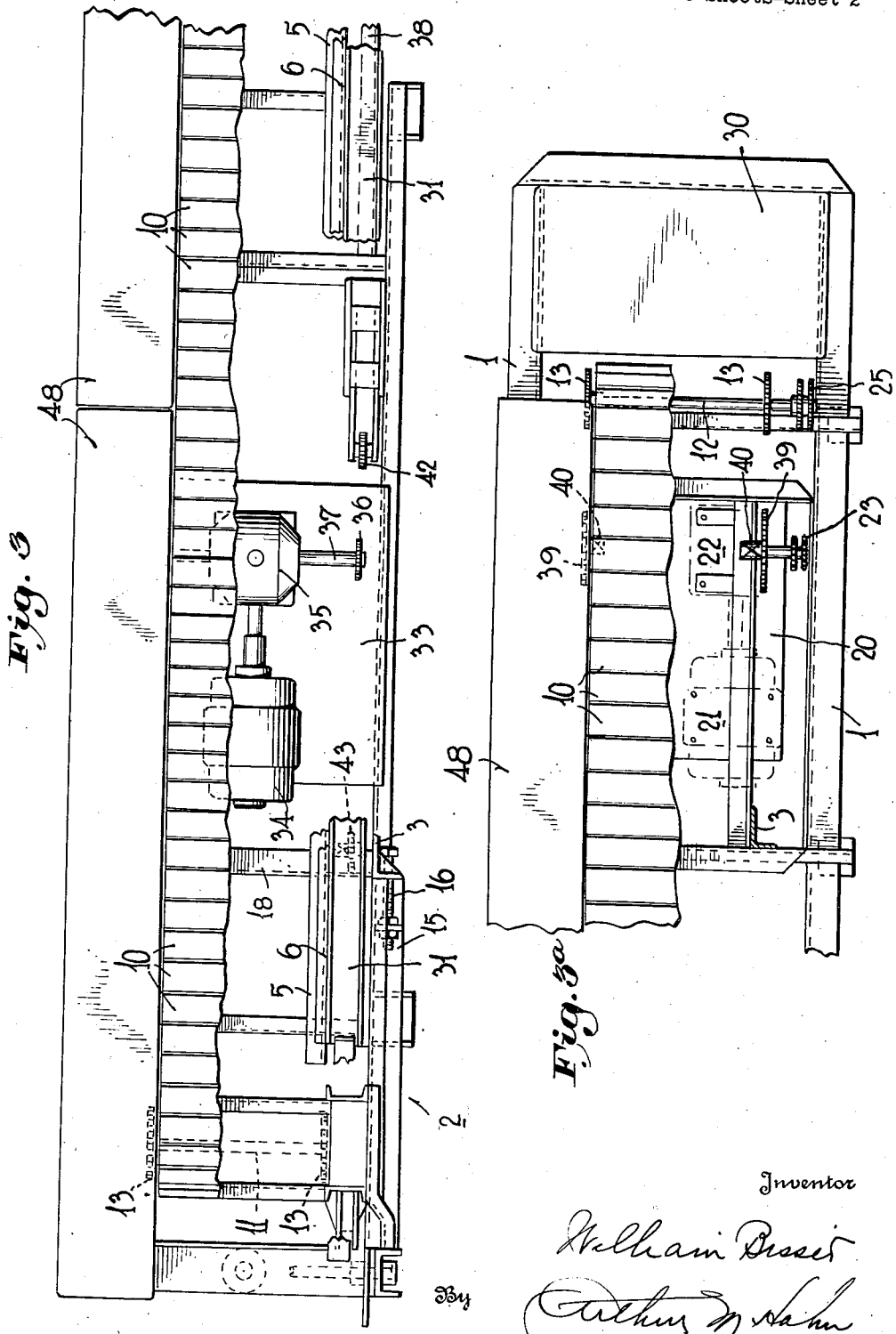

Jan. 6, 1942.  W. BISSET  2,268,692
LOADING AND UNLOADING CONVEYER APPARATUS
Original Filed March 2, 1939  5 Sheets-Sheet 3
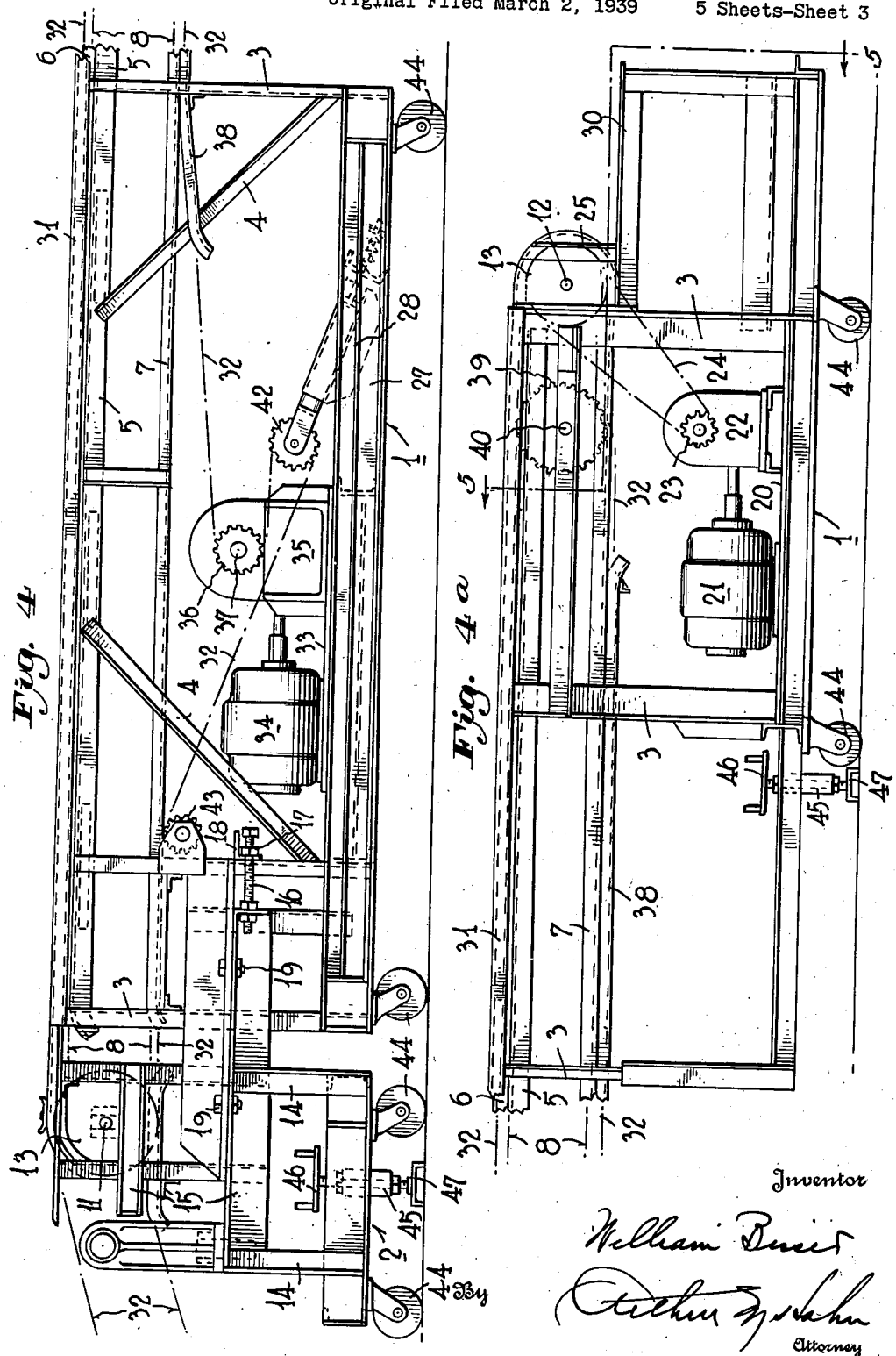

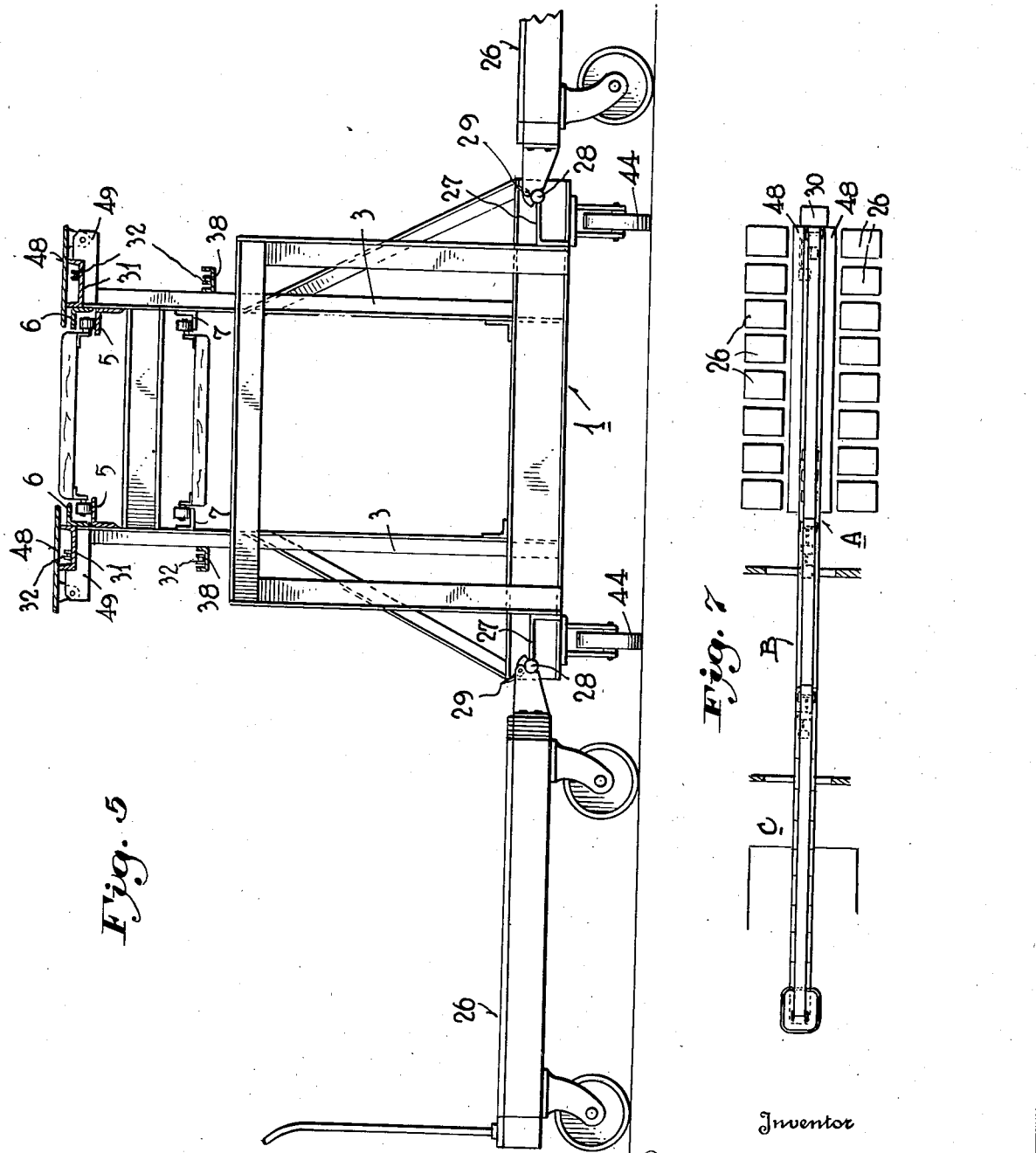

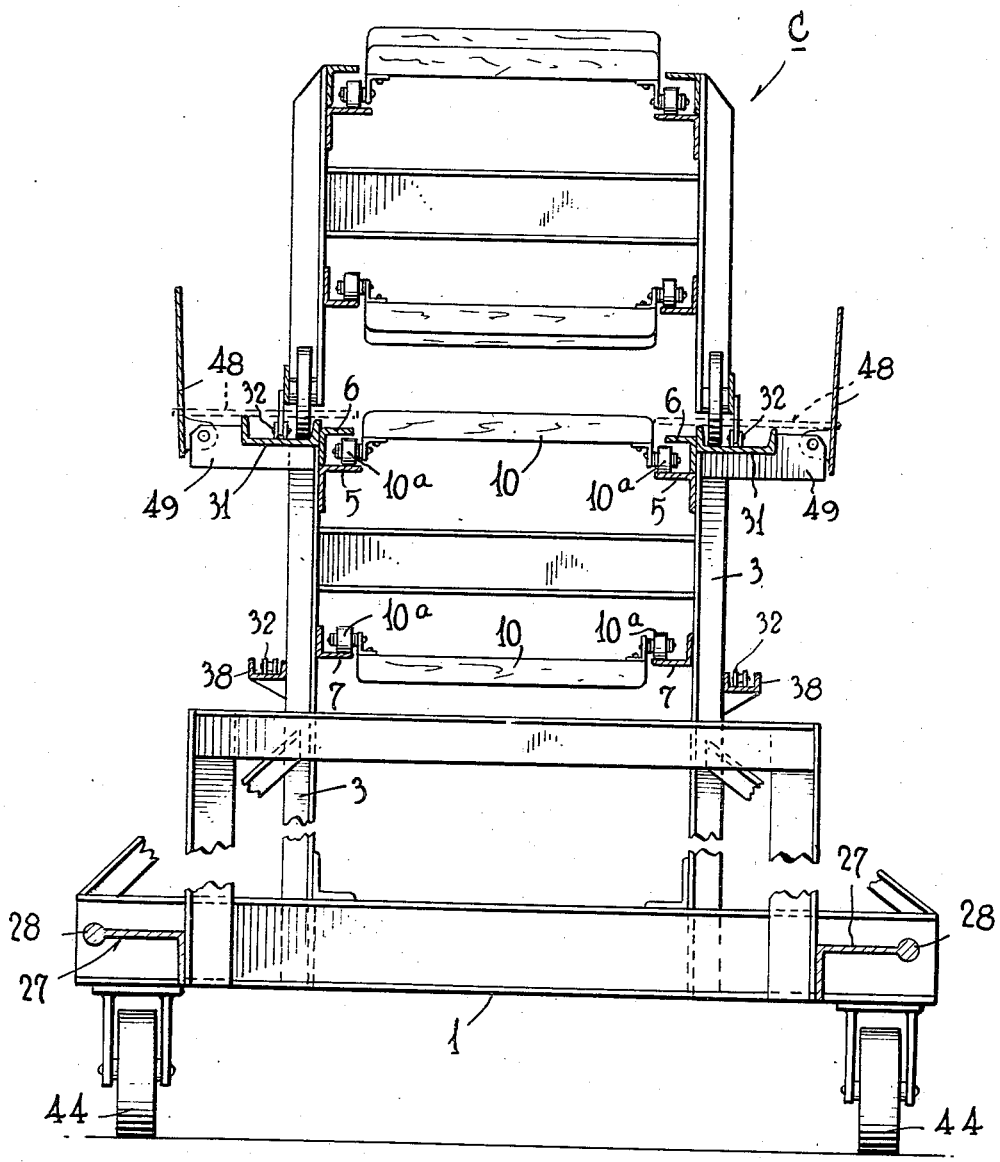

Patented Jan. 6, 1942

2,268,692

UNITED STATES PATENT OFFICE 2,268,692

LOADING AND UNLOADING CONVEYER APPARATUS

William Bisset, Port Hope, Ontario, Canada, assignor to Mathews Conveyer Company, Limited, Port Hope, Ontario, Canada, a corporation of Canada Original application March 2, 1939, Serial No. 259,443. Divided and this application April 14, 1941, Serial No. 388,566

9 Claims. (Cl. 198—19)

This invention relates to conveyers and is particularly directed to a shed conveyer which serves as a receiving and/or discharging station when used in connection with apparatus for loading and unloading boats.

This application covers subject matter which has been divided out of my co-pending application, Serial No. 259,443, filed March 2, 1939, and issued as Patent No. 2,242,206, for Loading and unloading conveyer apparatus. The shed conveyer herein described, although capable of general application, was primarily designed for use with a loading and unloading apparatus such as that disclosed in my aforementioned co-pending application.

One of the objects of the present invention is to provide a shed conveyer for use with loading and unloading apparatus which shall include means to facilitate the assorting of articles being removed from the conveyer.

Another object is to provide such a shed conveyer which shall facilitate the transfer of articles from the conveyer to storage or other destination and vice versa.

Another object is to provide a shed conveyer of this character which is adapted to hold a flexible conveyer positioned on its top.

Another object is to provide a shed conveyer of this character which may be easily handled to quickly position the same for operation or storage within the shed.

A further object is to provide a shed conveyer with power means for moving a flexible conveyer to and from the top of said shed conveyer.

With the foregoing and other objects in view, the invention may be stated to be the various novel features of construction and arrangement, all of which will be fully described hereinafter and pointed out in the appended claims.

In the drawings accompanying and forming a part of this specification, I have shown an illustrative embodiment of my invention and wherein Figure 1 is a side elevation of a loading and unloading apparatus in operative position showing a shed conveyer constructed in accordance with my invention;

Figure 2 is a similar view, but showing the apparatus in storage position on the shed conveyer;

Figures 3 and 3a are top plan views of the shed conveyer with parts broken away and central portions omitted;

Figures 4 and 4a are side elevational views of the shed conveyer with central portions omitted;

Figure 5 is a vertical sectional view taken on the line 5—5 of Figure 4a;

Figure 6 is a similar view showing the flexible conveyer in storage position on top of the shed conveyer; and Figure 7 is a top plan view of the apparatus as shown in Figure 1.

As illustrated in Figures 1 and 2, the entire loading and unloading apparatus consists of a shed conveyer A, an intermediate conveyer section B and a snake or flexible conveyer C. As fully explained in my aforementioned co-pending application, power means are provided for moving the flexible conveyer C from operative position as shown in Figure 1 to storage position on top of the shed conveyer as shown in Figure 2 or from storage position to operative position.

The shed conveyer comprises a substantially rectangular main base frame 1 that is formed of channel iron or other suitable material, and a smaller but similarly shaped auxiliary base frame 2 that is connected for movement longitudinally with respect to the main frame as will be more fully described hereinafter. Rising from each side of the main base frame 1 at suitable intervals are a plurality of vertical angle irons 3 and diagonal truss members 4. These angle irons 3 and trusses 4 support three pairs of longitudinally extending and vertically spaced angle irons 5, 6 and 7 arranged horizontally on opposite sides of the conveyer. The angle irons 5 and 5 form runways for the upper and lower runs respectively, of a pair of transversely spaced conveyer side chains 8. These runways support and guide the chains 8 throughout their horizontal travel along the conveyer. The angle irons 6 are arranged above the runways 5 and the upper run of the chains 8 to form a protective covering for the chains. The transversely spaced chains 8 are interconnected by a plurality of pallets 10 which receive and support the articles being loaded or unloaded and carried on the conveyer. The chains and pallets per se are of standard construction and hence need not be described in detail. The pallets and chains are preferably supported by rollers 10a (Figure 6) to eliminate as much friction as possible due to the movement of the conveyer along the runways 5 and 7.

Transversely disposed shafts 11 and 12 are journalled in suitable bearings which are mounted on the framework at each end of the conveyer. Each of the shafts 11 and 12 has a pair of transversely spaced sprocket wheels 13 mounted thereon to engage the chains 8 and guide them in their travel between the runways 5 and 7.

As shown particularly in Figure 4, the shaft 11 which holds the sprocket wheels 13 at the outer or left hand end of the conveyer is carried by the structure rising from the auxiliary base frame 2. This auxiliary structure comprises vertical members 14 to which are secured horizontal members 15 disposed longitudinally and transversely of the frame. Two of the longitudinally disposed members 15 project in overlapping relation with the main frame 1 and are operatively connected to a vertical support 3 by a threaded bolt 16 and a nut 17 which is mounted on a cross member 18. Obviously, the bolts 16 may be rotated to vary the longitudinal displacement of the auxiliary frame with respect to the main frame and thus tighten or loosen the pallet conveyer side chains 8. Once adjusted, the parts may be secured in position by tightening bolts 19.

As shown particularly in Figure 4a, a suitable platform 20 is carried by the base frame 1 to support a prime mover for the pallet conveyer such as an electric motor 21. It is obvious that any other suitable prime mover could be used instead of the electric motor 21. The motor 21 is connected through a standard reduction gear 22, also supported on the platform 20, to a drive sprocket 23. A chain 24 connects the drive sprocket 23 to a driven sprocket 25 which is mounted on the shaft 12. Thus, the motor drives the sprocket 25, which in turn drives the sprockets 13 that are mounted on the shaft 12. By this means, the pallet conveyer is driven to move articles therealong.

In order to facilitate the transfer of articles to and from the shed conveyer, a plurality of trucks 26 may be arranged along each side thereof and detachably connected thereto as shown in Figures 5 and 7. With this arrangement an operator, standing with one foot on the truck and the other foot on one of a pair of angle irons 27 which extend longitudinally along each side of the base frame 1, may easily transfer bags from the conveyer onto the truck. As clearly shown in Figures 5 and 6, the angle irons 27, in addition to forming a foot rest, are provided with rounded enlargements 28 running along the edge of the horizontal flange. The trucks 26 are each provided with a suitable coupling 29 of standard or approved construction which is adapted to engage over the enlargement 28 to hold the truck in operative relation to the shed conveyer. When the trucks are coupled in this manner they are held stationary while the operators transfer articles between the conveyer and the trucks.

In addition to the trucks 26, a receiving table 30 is carried by the sub frame 1 at the inner or right hand end of the shed conveyor. This table is adapted to receive any articles which are not removed by the operators stationed along the sides of the conveyer.

Since the flexible conveyer C is stored on top of the shed conveyer A when the apparatus is not in use, the shed conveyer is provided with means for supporting the flexible conveyer and also means for moving the flexible conveyer from storage position to operative position and vice versa.

The supporting means consists of comparatively shallow channel members 31 that are supported, one on each side of the conveyer, on top of the uprights 3 and outside of the angle irons 6. These channels serve as a support for the wheel supported flexible conveyer C when it is in storage position, and also as a runway for this conveyer when it is being moved to and/or from operative position.

The means for moving the flexible conveyer C consists of power driven endless chains 32 which are connected to the flexible conveyer. A platform 33 (Figure 4), which extends transversely of the base frame 1, supports an electric motor 34 or other suitable source of power, and a standard reduction gear 35. Sprocket wheels 36 are mounted on each end of the transversely extending shaft 37 of the reduction gear. These sprocket wheels are driven by the motor 34 acting through the reduction gear, and they engage and drive chains 32 to move the flexible conveyer C. The upper runs of the chains 32 are supported by the shallow channels 31. The lower runs of these chains are guided and supported by smaller channel members 38 which extend longitudinally on each side of the conveyer and are carried by uprights 3. At the inner or right hand end of the shed conveyer, the chains are guided between their upper and lower runs by sprockets 39 which are mounted on transversely extending stub shafts 40. Sprockets are positioned on the intermediate unit B to similarly guide the chains 32 between the upper and lower supports in a manner and for purposes which are more fully described in my aforementioned copending application, but which form no part of the present invention. The lower chain guideways 38 do not extend continuously between the ends of the conveyer, but are broken over the motor 34 and reduction gear 35, to permit the chains 32 to engage the sprocket wheels 36. From the motor, the chains extend over angularly disposed spring urged take-up sprockets 42 (Figure 4) and then over fixed idler sprockets 43 which guide them onto the lower chain supports 38. When power is applied to the motor, the chains 32 are driven by the sprockets 36 and the flexible conveyer C is moved onto or off of the shallow channel members 31 of the shed conveyer, depending upon whether the apparatus is to be stored or put into operation.

The entire shed conveyer is mounted on swivel caster wheels 44 arranged at suitable intervals beneath the base frames 1 and 2, and it will be understood that both the main frame and the auxiliary frame move as a unit. The purpose of the swivel caster wheels 44 is to permit the shed conveyer, with the flexible conveyer positioned on top thereof, to be easily and quickly moved from storage to operative position within the shed.

When the apparatus is in operation, the shed conveyer must be steady or serious damage is likely to result due to the movement of either the flexible conveyer or the shed conveyer. To guard against such movement, the base frames 1 and 2 of the shed conveyer carry a plurality of vertically disposed screws 45 (Figures 4 and 4a) each of which has an operating handle 46 fitted to its upper end, and a suitable ground engaging member 47 connected to its lower end. It is obvious, that the handles 46 may be rotated to either partially or completely lift the weight of the shed conveyer from the swivel caster wheels 44 and thereby anchor the conveyer in the desired position. When the conveyer is to be moved again, the handles 46 are rotated in the opposite direction so it may be rolled on the swivel caster wheels 44.

After the flexible conveyer C has been moved to operative position, the shallow channel members 31 are covered over by cover plates 48 as clearly shown in Figure 5. These cover plates are hinged to and supported by laterally projecting arms 49 that are secured to uprights 3 and the channel members 31. As shown in Figure 5, the top surface of these cover plates is arranged substantially flush with the top surface of the pallets 10. Thus, articles will slide easily from the pallets onto the cover plates. When the conveyer is not in use, the cover plates are turned to a vertical position as clearly shown in Figure 6, so the flexible conveyer may be drawn up onto the channel members 31.

In the operation of the conveyer, assuming that a ship is to be unloaded, the shed conveyer, together with the flexible conveyer positioned on top thereof, is moved from its storage space in the shed to a position in front of a door. The operator then controls the operation of the motor 34 which causes the flexible conveyer C to be moved on its wheels from the shed conveyer A over the intermediate conveyer B and into the hold or other storage space of the ship. The control means, and the operation of the flexible conveyer C and the intermediate conveyer B sections are fully described in my aforementioned co-pending application, but form no part of the present invention.

When all of the parts of the apparatus are thus positioned, the pallet conveyers on each of the sections are driven by their respective motors. The articles comprising the cargo are dumped onto the flexible conveyer, then fed to the intermediate conveyer and finally fed onto the shed conveyer. The cargo usually consists of several different articles and different brands of the same articles which are mixed together in the hold of the ship and must be assorted when the ship is unloaded. This assorting is accomplished as the articles are moved along the shed conveyer by the pallets 10. As previously described, a plurality of platform trucks 26 are secured to the shed conveyer on either side thereof by the engagement of couplings 29 with the enlarged edge 28 of the angle irons 27. An operator stands with one foot on a truck and the other foot on the angle iron 27. Each operator is assigned a certain brand or type of article in the cargo, and when such an article comes along the conveyer, he slides it onto one of the cover plates 48 and then onto his truck. Thus, all of the articles of the same type or brand are collected on one truck. When a truck is filled, it is uncoupled, moved away to its destination, and another truck replaces it.

After the ship has been unloaded, the same apparatus may be used to reload it in which case the shed conveyer is operated in the reverse direction. That is, the motor 21 is reversed and the chains 8 are driven in the opposite direction. When the apparatus is no longer in use, the cover plates 48 are turned to their vertical position and the flexible conveyer C is moved back onto the shallow channel members 31. The shed conveyer is then returned to its storage space.

Although I have illustrated and described my conveyer in connection with a loading and unloading apparatus for ships, obviously, it may be used for other purposes without departing from the invention.

What I claim is:

1. A conveyer of the character described comprising, a base, an endless conveyer supported by said base and movable longitudinally thereof, a pair of transversely spaced supports extending longitudinally along each side of said endless conveyer and adapted to support another conveyer positioned thereon, and pivotally mounted cover plates for said supports, said cover plates being movable to and from a horizontal position and being adapted to cover said supports and form tables along each side of and substantially flush with said endless conveyer in said horizontal position.

2. A conveyer of the character described comprising, a base, an endless conveyer supported by said base and movable longitudinally thereof, a pair of transversely spaced supports extending longitudinally along each side of said endless conveyer and adapted to support another conveyer thereon, means for moving said second conveyer onto and off of said supports, and cover plates pivotally mounted and movable to horizontal and vertical positions, said cover plates being adapted to form tables over said supports when moved to a horizontal position.

3. A conveyer of the character described comprising, a base, an endless conveyer supported by said base and movable longitudinally thereof, longitudinally disposed tables arranged along each side of the upper run of said endless conveyer and substantially flush therewith, longitudinally disposed members secured to the sides of said base and having an enlargement along one edge, a plurality of trucks positioned adjacent said base, and couplings on said trucks adapted to coact with said enlarged edge for securing them to said base whereby articles may be manually transferred between said conveyer and said trucks.

4. A conveyer of the character described comprising, a base, an endless conveyer supported by said base and movable longitudinally thereof, a pair of transversely spaced supports extending longitudinally along each side of said endless conveyer, said supports being adapted to support another conveyer positioned thereon, means for moving said second conveyer to and from its position on said supports, pivotally mounted cover plates movable to and from horizontal position, said cover plates being adapted to overlie said supports and form tables disposed along side of and substantially flush with the upper run of said endless conveyer, and couplings for detachably connecting a plurality of trucks to said base whereby said trucks will be secured adjacent said tables to facilitate the transfer of articles between said tables and trucks.

5. A conveyer of the character described comprising, a base, transversely spaced supporting members extending upwardly from said base, vertically and transversely spaced guideways secured to the inner sides of said supporting members to support the upper and lower runs of an endless conveyer longitudinally of said base, vertically and transversely spaced guideways secured to the outer sides of said supporting members to support the upper and lower runs of endless chains, the upper of said last named guideways forming transversely spaced tracks to support a second conveyer, and power operated means connected to said second conveyer by said endless chains for moving the second conveyer onto and off of said tracks.

6. A conveyer of the character described comprising, a base, transversely spaced supporting members extending upwardly from said base, vertically and transversely spaced guideways secured to the inner sides of said supporting members to support the upper and lower runs of an endless conveyer longitudinally of said base, vertically and transversely spaced guideways secured to the outer sides of said supporting members to support the upper and lower runs of endless chains, the guideways supporting the upper runs of said endless chains forming tracks to support a second conveyer, means connected to said endless chains for moving said second conveyer onto and off of said first conveyer, and pivotally mounted plates adapted to cover said tracks when the second conveyer is off of said first conveyer to form tables substantially flush with the upper run of said endless conveyer.

7. A conveyer of the character described comprising, a base, two sets of vertically and transversely spaced guideways supported by said base, one of said sets being arranged to carry the upper and lower runs of an endless conveyer, the second of said sets being arranged to carry the upper and lower runs of endless chains, the guideways carrying the upper run of said endless chains forming tracks to support a second conveyer, power means connected to said second conveyer by said chains to move the second conveyer onto and off of said tracks, pivotally mounted plates adapted to overlie said tracks when the second conveyer is off of the first conveyer to form tables substantially flush with the upper run of said endless conveyer, and couplings for detachably connecting a plurality of trucks to said first conveyer to secure them adjacent said tables whereby articles may be manually transferred between said conveyer and said trucks.

8. A conveyer of the character described comprising, a base, an endless conveyer supported by said base and movable longitudinally thereof, a pair of transversely spaced supports extending longitudinally along each side of said endless conveyer, said supports being adapted to support another conveyer positioned thereon, a prime mover carried by the first conveyer and operatively connected to the second conveyer by endless chains to move said second conveyer onto and off of said first conveyer, pivotally mounted plates adapted to overlie said supports to form tables disposed along each side of and substantially flush with the upper run of said endless conveyer, and couplings for detachably connecting a plurality of trucks to said base to secure them adjacent said tables whereby articles may be manually transferred between said conveyer and said trucks.

9. A conveyer of the character described comprising, a base, an endless conveyer supported by said base and movable longitudinally thereof, longitudinally disposed tables arranged along each side of the upper run of said endless conveyer and substantially flush therewith, longitudinally disposed members secured to the sides of said base, a plurality of trucks positioned adjacent said base, and couplings on said trucks adapted to coact with said members for securing them to said base whereby articles may be manually transferred between said conveyer and said trucks.

WILLIAM BISSET.